United States Patent [19]

Fleischauer

[11] 4,372,442

[45] Feb. 8, 1983

[54] TORQUE-TRANSMITTING DRIVE

[75] Inventor: Fred J. Fleischauer, Pittsburgh, Pa.

[73] Assignee: Ermanco Incorporated, Spring Lake, Mich.

[21] Appl. No.: 73,901

[22] Filed: Sep. 10, 1979

[51] Int. Cl.³ ............................................. B65G 13/07
[52] U.S. Cl. ..................................... 198/790; 474/63; 474/166; 474/186; 464/30
[58] Field of Search ............... 198/781, 787, 789, 790, 198/831; 64/30 R, 31; 474/61–63, 66–68, 86, 166, 186

[56] References Cited

U.S. PATENT DOCUMENTS

| Re. 25,192 | 6/1962 | Schurr et al. | 474/63 |
| 3,610,404 | 10/1971 | Fleischauer et al. | 198/790 |
| 3,838,767 | 10/1974 | Taylor | 198/831 |
| 4,160,500 | 7/1979 | Vermehren | 198/831 |
| 4,198,833 | 4/1980 | Fleischauer et al. | 198/789 |

FOREIGN PATENT DOCUMENTS

| 4452 | 10/1979 | European Pat. Off. | 198/790 |
| 152470 | 11/1955 | Sweden | 198/790 |

*Primary Examiner*—Joseph E. Valenza
*Attorney, Agent, or Firm*—Lockwood, Dewey, Alex & Cummings

[57] ABSTRACT

A torque-transmitting drive having a driving member and a driven member spaced therefrom with an endless transmission belt engaging the members to transmit torque from the driving member to the driven member. The endless belt is folded over one of these members such that two strands of this belt pass over the one member and this same one member thereby does not pass through the endless belt. A bearing sleeve is further slippingly mounted on this one member, over which the endless belt folds such that one strand of the belt at the fold passes over the bearing sleeve. Thus, one strand at the belt fold is in driving engagement with the member and the other strand of the endless belt moves in the opposite direction such that the bearing sleeve is rotating in a direction opposite to that of the member over which the belt folds. When replacing belts, it is not necessary to disturb or dismantle the member over which the endless belt folds, as that member does not pass through the belt.

5 Claims, 9 Drawing Figures

TORQUE-TRANSMITTING DRIVE

BACKGROUND OF THE INVENTION

The present invention relates to torque-transmitting drive.

Although the invention is described primarily in conjunction with conveyors such as live roller conveyors and accumulation conveyors, it will be evident that the torque-transmitting drive of the present invention is of general utility and is adaptable to a wide range of applications.

Prior torque-transmitting drives, for example as used in live roller conveyors, have been more or less successful for their specific intended purposes. However, these prior torque-transmitting drives have been of limited utility owing to problems involving maintenance and replacement of parts. For example, the drive for a live roller conveyor system illustrated in U.S. Pat. No. 3,650,375, issued Mar. 21, 1972, has been a successful system. But when individual endless conveyor belts break, practically complete disassembly of the conveyor is required to replace the endless drive belts. This is due to the fact that the drive shaft passes through each of the endless belts, as does each of the driven rollers on the conveyor. Thus, when one replaces a drive belt, the entire drive shaft must be disassembled from the conveyor system in order to loop the replacement endless drive belt over the end of the drive shaft. A principal object of the present invention is to eliminate this problem and to provide a torque-transmitting drive wherein the endless drive belts may be readily replaced without complete disassembly of the machine or disassembly of the drive shaft from its mounts.

SUMMARY OF THE INVENTION

The torque-transmitting drive of the present invention generally comprises a driving member, a driven member spaced therefrom, and an endless tramsmission belt engaging these members to transmit torque from the driving member to the driven member. The endless belt is folded over one of these members (as opposed to having that member pass through the endless belt) such that two strands of the belt pass over this one member without the member actually passing through the endless belt. A bearing sleeve is slippingly mounted on this one member over which the belt folds such that one strand of the belt at the fold passes over the bearing sleeve. Thus, the strand of the endless belt which is not engaging the bearing sleeve moves in the same direction as the rotating member whereas the bearing sleeve rotates in the opposite direction of the one member, and that strand passing over the bearing sleeve thus rotates in a direction opposite to the direction of rotation of this member over which it is slippingly mounted. Thus, when the endless belt is either removed or a replacement belt is installed, since the belt only passes over, or folds over or around the said one member, that member, at least, does not have to be dismantled in any way, as the belt merely folds over it and that member does not pass through the belt. Accordingly, the member about which the belt folds does not have to be passed through the endless belt for belt installation.

By way of example, if the torque-transmitting drive of the present invention is utilized in a live roller conveyor system, the consequences are that the entire drive shaft of the conveyor would not have to be disassembled merely to replace one endless belt, as is the present practice.

The torque-transmitting drive of the present invention may also be arranged whereby the endless belt folds not only over just one of the driven or driving members, but is folded over both of them such that neither member passes through the endless belt. In this arrangement, a bearing sleeve is slippingly mounted on both the drive member and the driven member. Thus, where the endless belt passes over or folds over each of the members, one strand of the belt at each fold will engage a respective bearing sleeve. In one embodiment of this latter arrangement, two free wheeling idler pullies may be mounted to a frame with opposite end loops of the endless belt respectively looped over the idler pullies with the aforesaid belt folds intermediate these opposite end loops of the belt. Thus, to remove the belt, one belt end loop is merely stretched off over its idler pulley which immediately and completely disengages it from the drive member and driven member as the belt is merely folded over these two members.

The torque-transmitting drive arrangement of the present invention may be utilized no matter whether the drive member and driven member are in parallel alignment or perpendicular alignment or skewed with respect to each other. For example, in live roller conveyor systems, the driven member or drive shaft may be either perpendicular to, parallel to, or skewed with respect to the driven live rollers of the conveyor.

The torque-transmitting drive of the present invention is also adaptable to a controlled slippage, limited-torque transmission drive such as might be utilized in accumulation conveyor systems. In this embodiment, where the endless belt folds over either one or both of the driven member or the drive member, both strands of the belt engage a sleeve on that respective member. One sleeve is a drive sleeve that is slippingly mounted on the member and the other sleeve is a bearing sleeve slippingly mounted on that member. However, the coefficient of friction between this one member and the drive sleeve is made greater than the coefficient of friction between this same one member and the bearing sleeve. Thus, under normal driving conditions, the drive sleeve will move with the rotating member and the corresponding belt strand engaging this drive sleeve will also move accordingly in the same direction. The bearing sleeve, however, will rotate in the opposite direction from the rotating member due to the fact that it has a very low coefficient of friction between it and the rotating member and the strand of belt passing over and engaging the bearing sleeve is rotating in the opposite direction. This embodiment will generally be used in accumulation conveyors, and the selected member on which these two sleeves would preferably be mounted would be the drive member or drive shaft. The belt, defined as oblong and endless with two end loops, will thus fold over the two sleeves of the drive shaft and opposite end loops of the belt will loop respectively around one or more live rollers to be driven at one loop end and at the opposite loop end, an idler pulley journaled to the conveyor frame. Thus, when packages being conveyed on such a conveyor system are stopped and accumulate, the maximum torque limits of the drive sleeve will be exceeded by the braking torque created on the transmission by the stopped roller. This drive sleeve will then also slip relative to the drive shaft, as does the bearing sleeve, to thereby temporarily stop the driven roller and at the same time, the strands of the endless belt passing over the drive shaft are not continually being worn down by direct frictional engagement with the rotating drive shaft, which continues rotation at all times.

In one such arrangement, the bearing sleeve may, in fact, be coaxially mounted over a portion of the drive sleeve with the coefficient of friction between the two sleeves being much less than that between the inner drive sleeve and the drive shaft to provide the same results. Any one of these sleeves may also take the configuration of an elastic annular split slippage member having rigidity (such as a split plastic or bearing metal sleeve), which can be readily snapped over the drive or driven member without disconnecting it. Such split slippage members may engage the drive or driven member under contraction stress or merely loosely fit thereover. Such a slippage member may also be gapped at the split, so that the belt wraps will continually contract the slippage member or sleeve in closer engagement with the underlying shaft, or in the situation where the slippage member is under its own contracting forces about the shaft, the gap permits the slippage sleeve to continually wear yet remain under contraction until such time that the gap closes.

The aforementioned sleeves are all preferably annularly grooved in order to receive and guide each pass of the belt and to grip more surface area of the belt on each pass over the respective sleeves.

The endless belt may be either elastic or non-elastic. When a non-elastic belt is provided, it is advisable to employ tension means to adjustably place the belt under tension.

With the torque-transmitting drive of the present invention, the endless belt driven by the drive member may be arranged such that it is in driving engagement with not just one driven member, but a plurality of driven members. For example, in a conveyor system, one drive belt may drive two or more live rollers of a live roller conveyor.

When the torque-transmitting drive of the present invention is utilized in a live roller conveyor system, it is obvious that the conveyor system may be either a straight conveyor section or a curved conveyor section, as the drive of the present invention is effective in either. In a curved conveyor section, the belt hook-up is identical to that of a straight conveyor section, except the drive shaft will generally be in skewed alignment with the driven conveyor rollers, as opposed to being perpendicular or parallel thereto.

Another feature of the present invention is that when it is utilized in the form of a conveyor, the entire bottom of the conveyor may be covered over for safety purposes so that none of the moving parts are exposed from the bottom side of the conveyor. Thus, no parts of the body or any object such as clothing can become entangled in these moving parts should an individual or object engage the underside of such a conveyor.

When the torque-transmitting drive of the present invention is used in a live roller conveyor, the live roller conveyor will normally have conveyor rollers secured at their ends to a conveyor frame under spring bias. Thus, each roller is usually independently removable from the conveyor frame by merely depressing a shaft end of a live roller axially inward under a spring bias. In this manner, an endless drive belt is installed by detaching one end of a conveyor roller and looping the endless belt over that end, and then re-engaging that end of the live roller with the conveyor frame. The other end of the belt is then grasped and stretched and the endless belt is folded about one side of an underlying drive shaft and then stretched over in idler pulley which is journaled to the frame. Where the two strands of the belt engage the drive shaft, one engages the drive shaft while the other engages a slippingly mounted bearing sleeve coaxially positioned over the drive shaft as this sleeve will rotate in a direction opposite to that of the drive shaft. Installation is thus complete without the requirement of dismounting or removing the drive shaft. In addition, the idler pulley may be adjustably secured to the conveyor frame to provide adjustable tensioning of the endless belt. To change the conveyor into an accumulation conveyor, an additional drive sleeve is also provided over the drive shaft as previously described wherein this drive sleeve has a larger coefficient of friction between it and the drive shaft than the coefficient of friction between the bearing sleeve and the drive shaft so that under normal conveyor conditions the drive sleeve will always rotate with the drive shaft, until such time that the respective conveyor roller or rollers are stalled.

In another unique configuration of the live roller conveyor of the present invention, the aforedescribed torque-transmitting drive of the present invention is utilized to drive a plurality of conveyor rollers in such a manner that one strand of the endless belt passes over at least two spaced snub rollers which underlie the series of driven rollers. These snub rollers are positioned underneath the series of driven rollers so as to snub the strand of belt passing between these two spaced snub rollers up into driving engagement with the underside of two or more of these driven conveyor rollers which are positioned between the spaced snub rollers. Thus, this drive strand of the drive belt is snubbed up into driving engagement to the bottom side of the driven conveyor rollers. Two very commendable advantages result from this unique configuration. One is that the drive belt does not pass over top of the driven conveyor rollers and as a result of this configuration, it is less likely for foreign objects such as clothing, human hair, packaged articles, etc., to become entangled in the belt wrap driving the live rollers. The second advantage is that the conveyor rollers do not have to be annularly grooved to receive a loop of the drive belt. With all conventional conveyors, the best is in one manner or another looped over the conveyor roller and the packages or articles being conveyed over the conveyor rollers should not come in contact with the drive belt passing over the conveyor roller. This is generally ccomplished by providing an annular groove in the roller which receives the loop of the drive belt such that the drive belt is not exposed above the surface of the conveyor roller. Thus, by driving the conveyor rollers from underneath as just described, these annular grooves do not have to be provided in the conveyor rollers in view of the fact that the drive belt engages the rollers from the underside or bottom side. This, of course, considerably reduces the cost of manufacturing the conveyor rollers which would otherwise require the provision of an annular belt groove. In addition, this type of conveyor is also extremely adaptable to zero pressure conveyor systems wherein an adjacent series of conveyor rollers are simultaneously driven by one belt and the next series of rollers driven by another belt, and the drive for each adjacent series is provided with a torque limited-slippage transmission drive for accumulation conveyors. A trip mechanism can be readily provided at each conveyor section of conveyor rollers driven by one belt such that when packages accumulate at that conveyor section, the mechanism is tripped to electrically or mechanically (or a combination thereof) stop the conveyor drive of the preceeding conveyor section.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE DRAWINGS

Figures 1, 2:
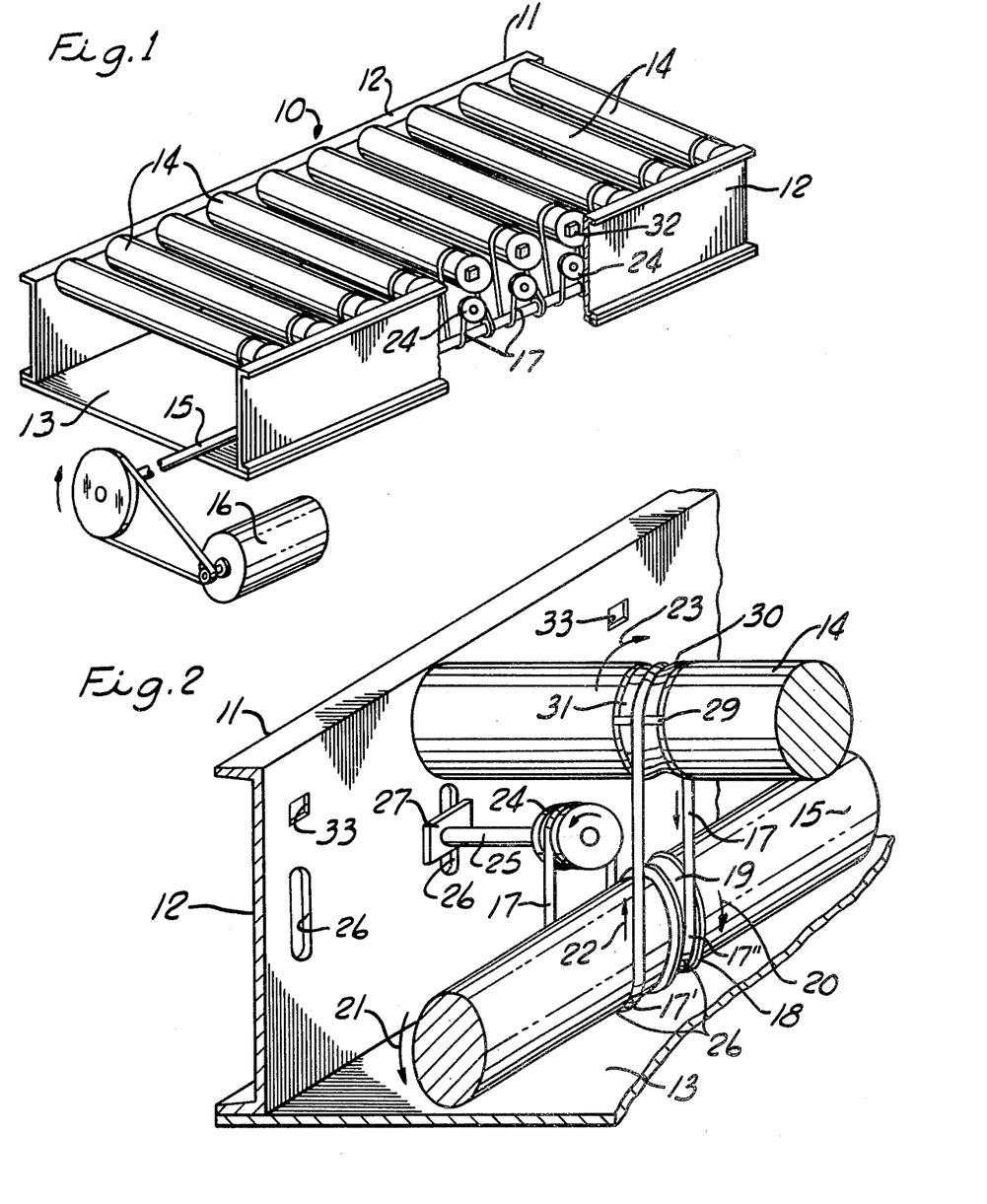
FIG. 1 shows in perspective a straight live roller conveyor section driven by one embodiment of the torque-transmitting drive of the present invention.
FIG. 2 is an enlarged perspective view in partial section illustrating in greater detail the torque-transmitting drive of the present invention utilized in FIG. 1.

Referring to FIG. 1, a straight section 10 of a live roller conveyor is illustrated and incorporates the torque-transmitting drive of the present invention. The live roller conveyor section 10 generally comprises frame 11 which includes two elongated side rails 12 which are secured in spaced relation to each other by cross support which in this configuration is in the form of a bottom cover plate 13 and cross bracing (not shown) which rigidly holds rails 12 in their spaced relationship.

A series of driven conveyor rollers 14 are transversely supported for rotation between side rails 12. An elongated drive shaft 15 underlies the rollers 14 and is journaled to frame 11 for driving rotation by means of the motor-pulley combination 16. Drive shaft 15 is thus the drive member and rollers 14 the driven members.

A plurality of elastomeric endless belts 17, preferably having a round cross-section, engage drive shaft 15 and respectively engage driven rollers 14 to transmit torque from drive shaft 15 to the driven rollers 14. The manner in which drive belts 17 are interengaged between the drive shaft 15 and the live rollers 14 for transmitting driving torque to the live rollers 14 is an important feature of the present invention. This is illustrated in an enlarged form in greater detail in FIG. 2.

Endless belts 17 are folded over or around or about drive shaft 15 such that two strands 17' and 17", of the belt, pass under or around a portion of the drive shaft without the drive shaft 15 itself actually passing through the endless loop of the belt. A bearing sleeve 18 is slippingly mounted in a coaxial manner on drive shaft 15 with one strand 17" of endless belt 17 at this fold passing over and engaging bearing sleeve 18 in the annular groove 19 thereof. The coefficient of friction between bearing sleeve 18 and drive shaft 15 is very small as compared to the coefficient of friction between strand 17' of the endless belt and drive shaft 15 as bearing sleeve 18 must rotate in the direction of arrow 20, or in the direction opposite to the direction of rotation of that of shaft 15 which is indicated by arrow 21. Strand 17' of the endless belt 17 being in driving engagement with shaft 15 moves in the direction of arrow 22, thus causing live roller 14 to be driven as indicated by arrow 23.

This torque-transmitting drive includes a free-wheeling idler pulley 24 mounted to side rail 12 of frame 11 via shaft 25 to which it is journaled. One end loop of belt 17 loops over idler pulley 24 and the opposite end loop of belt 17 loops over driven roller 14 with the fold 26 of belt 17 being intermediate these opposite belt loop ends. Shaft 25 which supports idler pulley 24 is, in turn, secured to frame rail 12 by a lock nut means (not shown) on the outside of rail 12. Shaft 25 passes through vertical slot 26 in side rail 12 and is secured by the aforesaid lock nut. Face plate 27 is welded to shaft 25 and acts as a back-up surface against the inside face of side rail 12 so that the lock nut means on the opposite side of side rail 12 may be securely tightened to prevent shaft 25 from sliding up or down in vertical slot 26. Thus before tightening the securement of shaft 25 to side rail 12, shaft 25 may be either raised or lowered in slot 26 to obtain and adjust the proper tension in the elastomeric belt 17. When the proper tension is attained, the lock nut arrangement on shaft 25 is tightened down.

Driven rollers 14 are annularly grooved at the area where endless belt 17 passes or loops thereover in driving engagement, and annular sleeves 30, also provided with an annular groove 31, are seated in the annular grooves of rollers 14. The annular groove 31 of sleeve 30 is sufficiently deep such that belt 17 which is seated therein is not exposed above the top of the rollers 14 so that packages being conveyed on the live rollers do not engage belt 17. Sleeve 30 is an elastic annular split slippage member having rigidity, and is generally molded of plastic and is split as indicated at 29 for easy snap on and snap off assembly over roller 14. The advantages and uses of such a split annular sleeve is fully described in co-pending patent application Ser. No. 700,299 filed June 28, 1976 for Controlled Slippage, Limited-Torque Transmission now U.S. Pat. No. 4,198,833 dated Apr. 22, 1980.

This elastic annular split member or sleeve 30 has many advantages not only in that it can be easily assembled and disassembled from the system, but also in that the coefficient of friction between the sleeve and the underlying roller 14 can be highly regulated. For example, the sleeve 30 may be provided with a very loose fit around roller 14 with or without a gap at the split 29. If a gap is provided at split 29, then the belt wrap of belt 17 over the sleeve 30 has a tendency to contract the ring or sleeve 30 into more extended engagement with the underlying roller 14. Alternatively, the inside diameter of sleeve 30 may be made smaller than the underlying roller 14 such that the sleeve 30 is always under contracting stress forces thereby providing a higher frictional engagement with the roller 14.

Sleeve 30 actually need not be provided at all when the system is used as an ordinary live roller conveyor. However, when the conveyor is being utilized as an accumulation conveyor, controlled slippage of the torque-transmission drive can be accomplished with sleeve 30 such that when roller 14 is stalled, the belt 17 together with sleeve 30 will continue to rotate. This keeps wear on endless belt 17 to a minimum. In a similar manner, bearing sleeve 18 may also be made in the form of an elastic annular split slippage member having rigidity, which is readily snapped over drive shaft 15.

Rollers 14 are detachably secured at their ends to side rails 12 of frame 11. The end shafts 32 of rollers 14 are angular and are held stationary and received in corresponding angular openings 33 in side rails 12. Rollers 14 are in turn journaled with bearings for rotation on the end shafts 32.

These end shafts 32 may be depressed axially into rollers 14 against a spring bias so that the end of the roller may be detached from frame 11. Thus, for example, when one desires to remove endless belt 17, he merely detaches the belt loop from over idler pulley 24 which thus simultaneously completely frees endless belt 17 from drive shaft 15. Then roller 14 is detached at its end and the belt loop there is merely slipped off over the end of roller 14. In the systems of the prior art, it was always necessary to disassemble shaft 15 from its journaled bearings which held it to the frame. From viewing FIG. 1, it can be seen that if the drive of the present invention were not utilized and one of the endless belts 17 in the middle of the conveyor section broke, one would have to disassemble shaft 15 from its bearing mounts on frame 11 and the new belt replaced in the mid section by slipping it over the end of the drive shaft and passing it down to the proper position. This, of course, in the prior art requires a complete shut-down of the system, which is not necessary at all with the torque-transmitting drive of the present invention. In fact, with the present invention, broken or worn belts may be replaced while the conveyor continues to run.

In the prior art, new or replacement belts could also be provided in severed form or as an open strand and then wrapped about the proper conveyor components and thereafter the open ends of the belt are heat welded together. However, this method is cumbersome and time consuming and accurate resultant welded endless belt lengths cannot be guaranteed.

While endless belt 17 has been described as an elastomeric belt, it is really not necessary that it be elastic in the sense that it will stretch. Of course, the belt must flex, but it does not necessarily have to stretch in view of the fact that pulley 24 is adjustable to provide the proper tension. Spring, gravity, or other tensioning devices can also be used for this purpose of providing belt tension.

Bottom cover plate 13 not only provides cross support for frame 11, but more importantly, it is a safety feature to prevent objects which might be underlying the conveyor from becoming entangled in the rotating drive parts.

Figure 3:
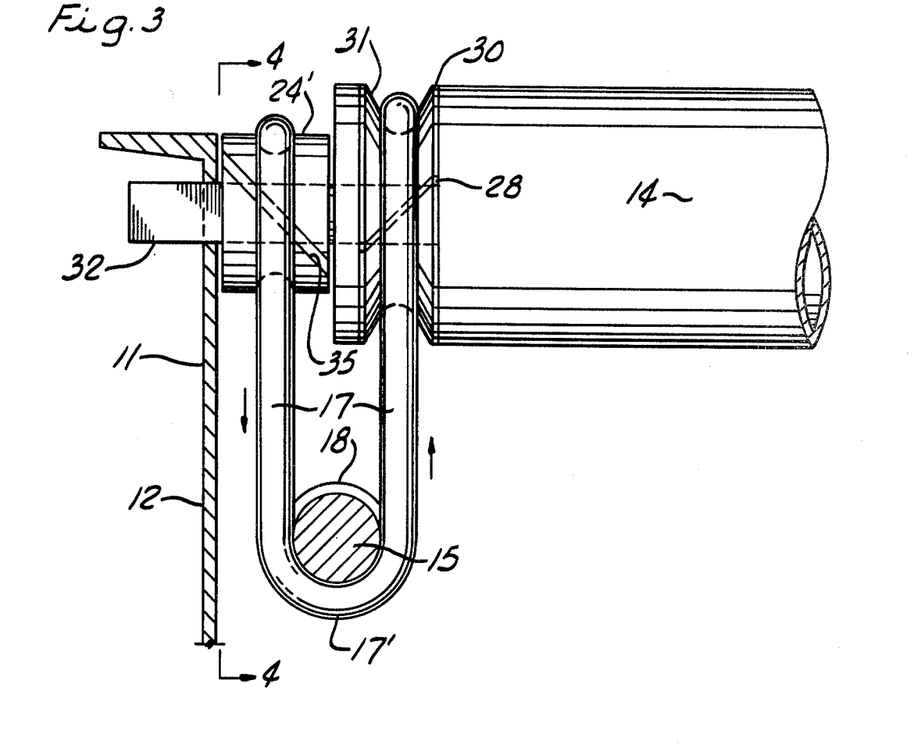
FIG. 3 is an enlarged view in front elevation and in partial section illustrating another embodiment of the torque-transmitting drive of the present invention as utilized in a live roller conveyor.
Figure 4:
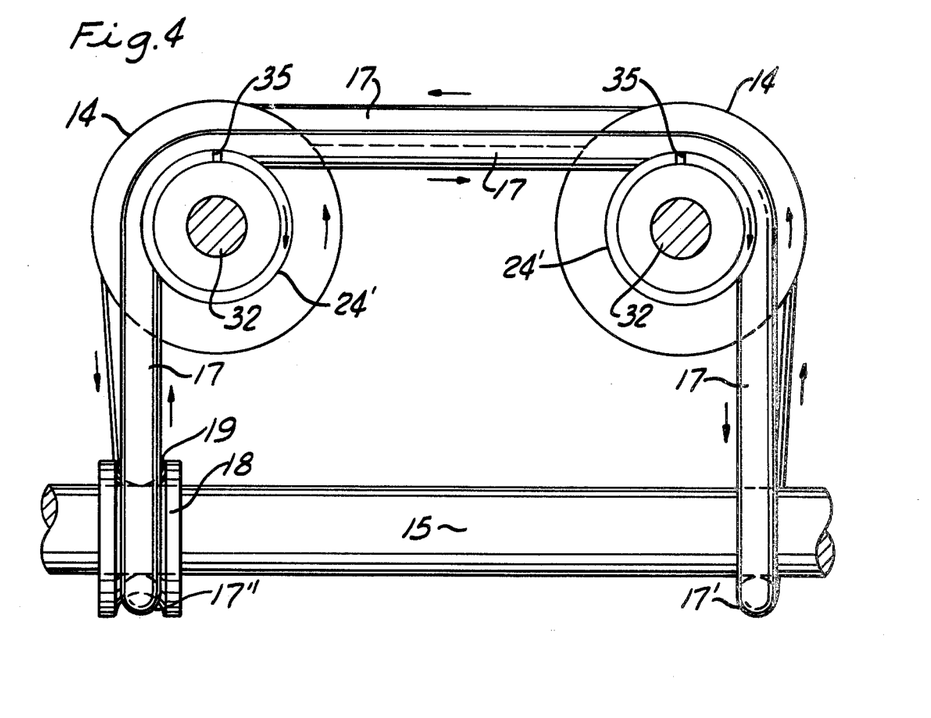
FIG. 4 is a sectional view in side elevation of the torque-transmitting drive illustrated in FIG. 3 as seen along section line 4—4.

Referring next to FIGS. 3 and 4, another embodiment of the torque-transmission drive of the present invention is illustrated which is in reality quite similar to the structure illustrated in FIGS. 1 and 2, but in this configuration, the drive belt 17 is driving a plurality of rollers 14, and the idler pulley 24 has been substituted with an idler sleeve 24' which has been positioned over the end shaft 32 of live rollers 14. Parts which are similar to those parts designated in FIGS. 1 and 2 are here designated with the same numerals.

Idler sleeve 24' is also provided with a split as indicated at 35 so that it also can be readily snapped over end shaft 32. It is further provided with an annular groove to seat endless belt 17. Idler sleeves 24' rotate in a direction opposite that of rollers 14. As previously described, shaft 32 is stationary and thus idler sleeve 24' rotates on the stationary end shaft. As is best seen in FIG. 4, one strand of endless belt 17 passes over and drives two live rollers 14 and the opposite strand of the endless belt 17 passes over two adjacent idler sleeves 24'.

Figure 5:
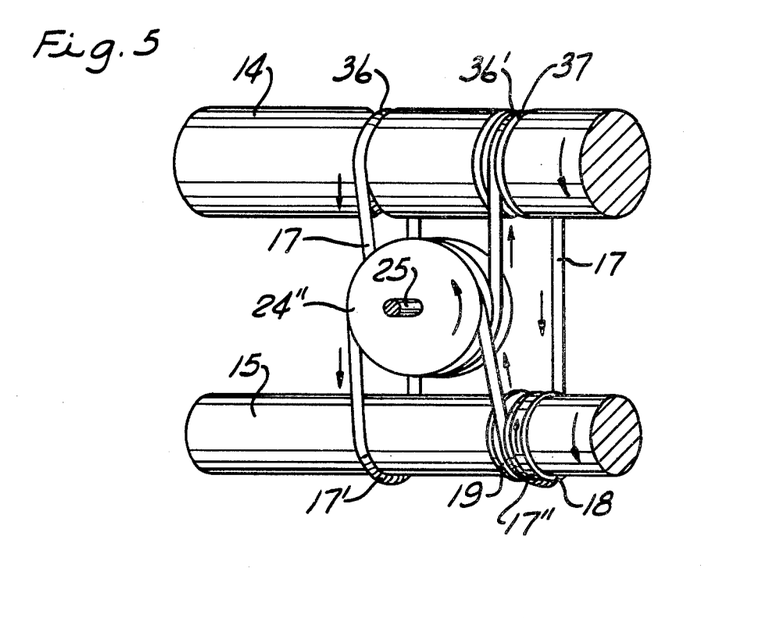
FIG. 5 is a perspective view in partial section illustrating yet another embodiment of the torque-transmitting drive of the present invention wherein the endless drive belt is folded over both the drive member and the driven member.

Another embodiment of the torque-transmitting drive of the present invention is illustrated in FIG. 5 wherein the drive member and driven member, drive shaft 15 and roller 14, are in a parallel configuration as opposed to a perpendicular configuration as illustrated in the previous Figures. As before, similar components are designated with the same reference numerals.

In this configuration, the idler pulley 24" has two annular pulley grooves, or is a double pulley to receive opposite end wraps of endless belt 17. In this configuration, endless belt 17 is not only folded over drive shaft 15, but it is also folded over driven roller 14, as illustrated at portions 36 and 36'. At the portion 36, driven member or roller 14 is provided with an annular groove so that endless belt 17 lies below the contact surface of roller 14. At fold 36', endless belt 17 rides in a grooved bearing sleeve 37 which is slippingly mounted in a corresponding annular groove of roller 14 with a low coefficient of friction therebetween as bearing sleeve 37 must rotate in the opposite direction of roller 14.

With this embodiment, in order to remove endless belt 17, one merely slips one loop end of the endless belt off of double pulley 24' and the belt is immediately free as shaft 15 and roller 14 do not pass through endless belt 17, endless belt 17 is folded over both of these members. It is thus obvious that no mechanical disassembly is required at all to remove or replace a belt. It should also be noted that, with the location of the grooved bearing sleeves 18 and 37 as shown, the drive shaft 15 and the driven roller 14 rotate in the same direction. By changing the location of the bearing sleeve on only one of the drive shaft or the driven roller such that the bearing sleeve underlies the opposite belt strand fold on that shaft (for example, bearing sleeve 18 is positioned under fold 17' instead of fold 17"), the driven roller or shaft will be driven in the opposite direction to the drive shaft.

Figure 6:
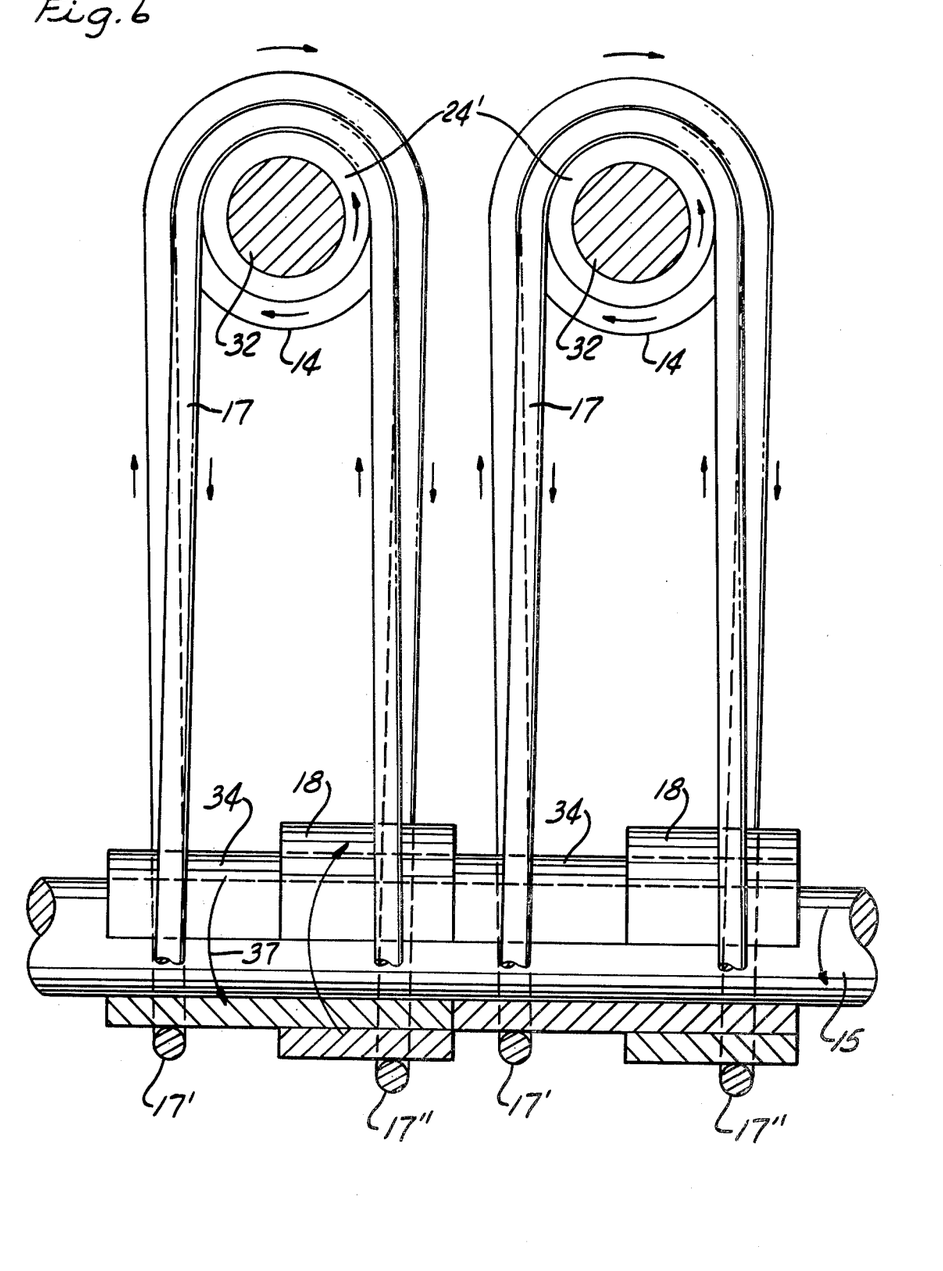
FIG. 6 is an enlarged view in side elevation and in partial section illustrating a further embodiment of the torque-transmitting drive of the present invention in a form adapted to be used in an accumulation conveyor.

Referring to the embodiment illustrated in FIG. 6, the configuration illustrated is quite similar in set up to that illustrated in FIGS. 3 and 4, except that in this instance, each endless drive belt 17 drives only one driven member or roller 14. Again, like parts are designated with the same reference numeral.

The crucial differences in the structure of FIG. 6 is the use of an extra sleeve or drive sleeve 34. Drive sleeves 34 are coaxially mounted on drive shaft 15 with a predetermined coefficient of friction therebetween such that under ordinary driving conditions, drive sleeve 34 rotates with shaft 15 as indicated by arrow 37. Bearing sleeve 18 is then coaxially mounted over top of drive sleeve 34 and it rotates in the direction opposite to that of drive sleeve 34 as the coefficient of friction between sleeve 18 and sleeve 34 is much lower than that between sleeve 34 and drive shaft 15. While sliding contact is shown between sleeves 18 and 34, ball or roller bearings may also be employed.

This configuration is utilized for the purpose of an accumulation conveyor, the stall torque of the drive being determined by the coefficient of friction between drive sleeves 34 and drive shaft 15. When packages accumulate on top of rollers 14 such that the torque opposing the drive torque of rollers 14 is sufficient to overcome the frictional drive between sleeves 34 and drive shaft 15, the stall torque of drive sleeves 34 will be attained and the rotation of sleeves 34 will cease and shaft 15 will merely continue to rotate in slipping engagement inside of sleeves 34 until such time that the stall torque applied to the top of rollers 14 is relieved. Sleeve 34 is shown in two sections but can be one so that a multiplicity of rollers can be driven by one drive sleeve 34. Such a configuration is particularly adaptable to zero pressure accumulation conveyors as will be further explained hereinafter.

Figure 7:
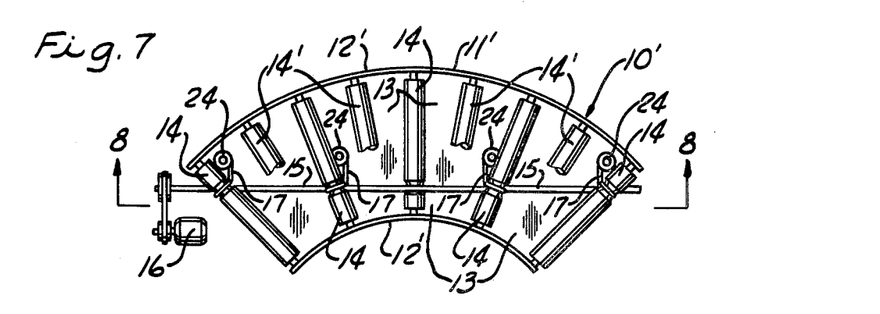
FIG. 7 is a plan view of a curved section of a live roller conveyor embodying the principals of the torque-transmitting drive of the present invention.
Figure 8:
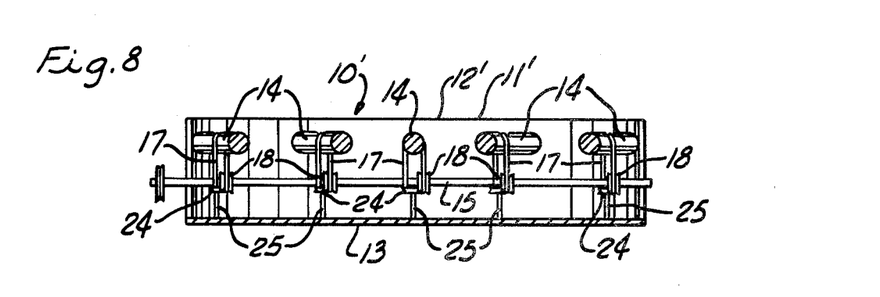
FIG. 8 is a sectional view in side elevation of the curved conveyor section illustrated in FIG. 7 as seen along section 8—8, with parts removed for illustration purposes.

Referring next to the configuration illustrated in FIGS. 7 and 8, here the conveyor section 10' is illustrated as a curved section to form a curved pass line as opposed to the straight section illustrated in FIGS. 1 and 2. Again, similar parts are designated with the same reference numerals. Also, the operation of this embodiment is identical to that illustrated in FIG. 1, the only real difference being that the idler pulleys 24 are mounted on the inside of bottom cover 13 instead of on the side rails 12 or 12'.

Rollers 14' on this curved section are not driven, and only alternate rollers 14 are actually driven. However, all rollers may be driven if desired. Rollers 14' which are illustrated in FIG. 7 have been removed in FIG. 8 for the purpose of illustration.

Figure 9:
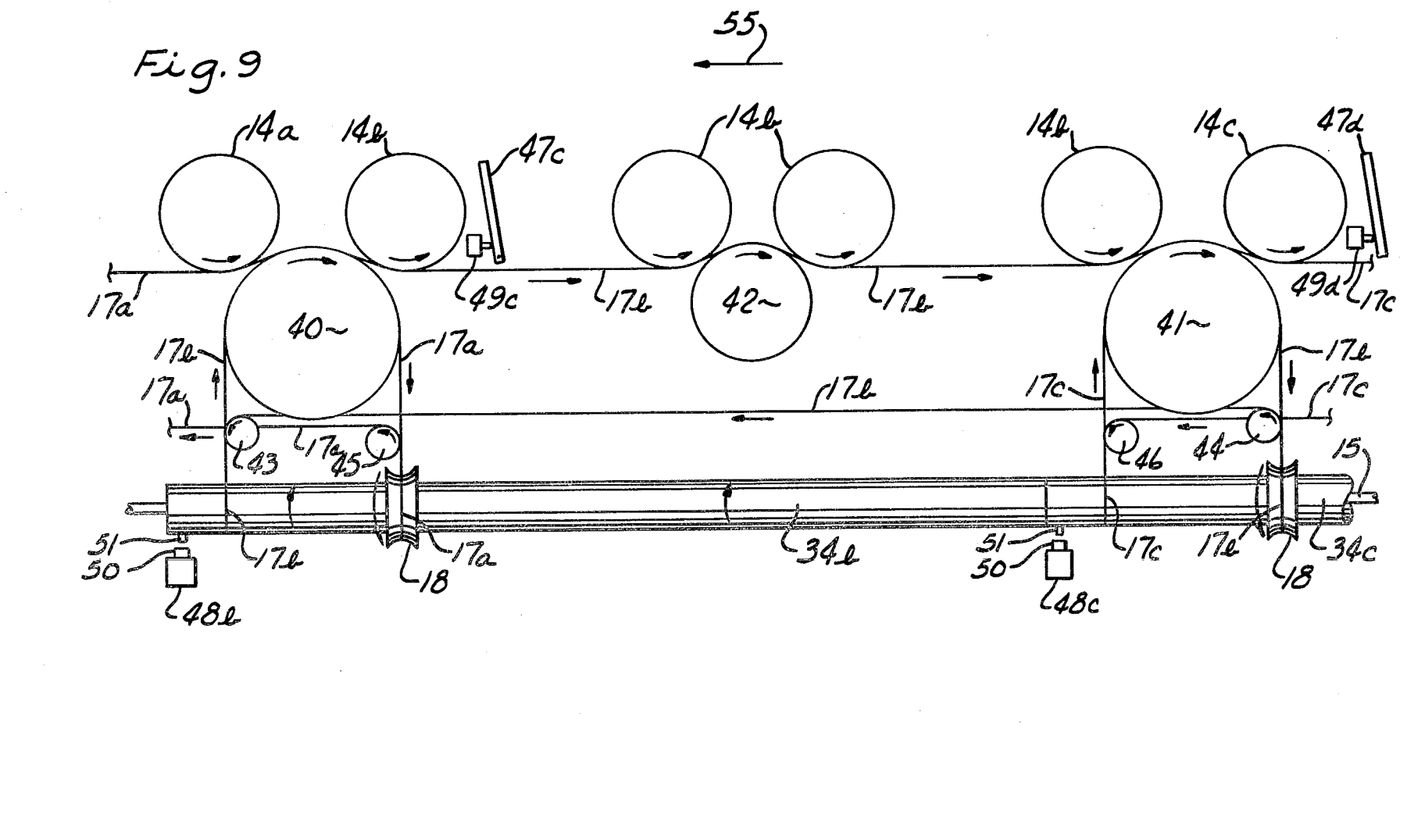
FIG. 9 is a diagrammatic view in side elevation of a zero pressure accumulation conveyor utilizing the torque-transmitting drive of the present invention.

FIG. 9 diagrammatically illustrates a novel zero pressure accumulation conveyor utilizing the torque-transmitting drive of the present invention. Here, the live or driven rollers 14 are driven in sections or groups with four rollers per section. For example, the four driven rollers 14b constitute one section. There is also a roller section of four rollers 14a to the left and a section of four rollers 14d to the right, and so on.

The four conveyor rollers 14a at the left of the Figure (only the last one is illustrated) are driven by belt 17a, the next series of rollers 14b are driven by belt 17b, and the next series of driven rollers 14c are driven by belt 17c. Each conveyor section is driven in the identical manner as the previous section.

The fundamentals of the belt drive are basically the same as that illustrated in previous Figures, and accordingly, like parts are designated with the same reference numerals, with the exception that letter subscripts are designated with some of the reference numerals to indicate segregation of the conveyor into section a, b, c, d, etc.

As each conveyor section is driven in an identical manner, the drive for conveyor rollers 14b will be described. Starting at the lower left-hand portion of the Figure, drive belt 17b is directly driven by and rides directly on drive sleeve 34b and the belt is thus driven upwardly as viewed in the Figure and wraps over the top of snub roller 40 and thereafter passes over a second snub roller 41, which is spaced from snub roller 40, both of said snub rollers 40 and 41 underlie driven rollers 14b. Snub rollers 40 and 41 are positioned to snub this strand of endless belt 17b up into driving engagement with the underside of all four driven rollers 14b which are positioned between the spaced snub rollers 40 and 41. The conveyor rollers are thus driven from underneath and since the endless belt 17b does not pass over the rollers 14b, it is less likely for objects or clothing to become entangled with the drive belt, and in addition, it is not necessary to provide annular grooves in rollers 14b for the drive belt 17b to ride.

Snub rollers 40 and 41 protrude slightly up into the space between adjacent drive rollers 14 in order to increase the amount of wrap of the drive belt 17b about the underside of rollers 14b. This, of course, increases the frictional drive engagement or contact length between belt 17b and the underside of rollers 14b. To even further assist in this, a center free-wheeling snub roller 42 is also provided in the same manner so that the degree of wrap of belt 17b about the underside of the two adjacent driven rollers will be increased. The result is that packages are conveyed on top of rollers 14b in the direction as indicated by arrow 55.

After endless belt 17b passes over snub roller 41, it proceeds downwardly and then wraps about bearing sleeve 18, and then proceeds to loop over idler pulley 44 and then continues to the left of the Figure and loops over idler pulley 43 and then downwardly to the point of beginning or the point of first description. As previously explained, drive sleeves 34b and 34c normally rotate with drive shaft 15, and bearing sleeve 18 rotates in the opposite direction.

The conveyor illustrated in FIG. 9 is set up as a zero pressure accumulation conveyor. In other words, if packages accumulate on section 14b of the conveyor, these packages will depress a bar lever 47 to the left and hold it in this position and thus at the same time actuate limit switch 49c. When limit switch 49c is thus activated, it in turn actuates solenoid 48c appearing in the lower right-hand corner of the Figure, which causes solenoid bar 50 to extend upwardly and engage arm 51 depending from rotating drive sleeve 34c. When this occurs, further rotations of drive sleeve 34c are stopped and thus drive belt 17c no longer continues to move and thus drive of the entire preceeding conveyor section 14c is temporarily stopped until such time that the packages depressing lever 47c move on to de-activate limit switch 49c.

While drive sleeve 34c is in its stop position as just described, drive shaft 15 nevertheless continues to rotate within sleeve 34c, and bearing sleeve 17 continues to rotate thereon as it is still being driven by belt 17b.

Each section of the conveyor is set up in the same manner so that the previous section will be stopped when packages accumulate on any adjacent advanced conveyor section. Thus, in each stalled conveyor section, no conveyor drive is being supplied to packages being conveyed thereon at that time and thus this conveyor is described as a zero pressure accumulation conveyor.

I claim:
1. A torque-transmitting drive comprising a frame, a rotatable driving member, a rotatable driven member spaced therefrom, an endless transmission belt engaging said members to transmit torque by frictional engagement from said driving member to said driven member with said belt folded over said members such that two strands of said belt pass over said members and neither member passes through said endless belt, a bearing sleeve slippingly mounted on each of said members with one strand of said belt at each fold passing over said bearing sleeve, and two free-wheeling idler pulleys mounted to said frame with opposite end loops of said belt respectively looped over said pulleys with said belt folds intermediate said opposite end loops.

2. The torque-transmitting drive of claim 1 wherein said members are parallel shafts.

3. The torque-transmitting drive of claim 1 wherein said members are skewed shafts.

4. A live roller conveyor comprising, a conveyor frame including two elongated side rails secured in spaced relation to each other, a series of driven conveyor rollers transversely supported for rotation between said side rails, a drive shaft underlying said rollers and journaled to said frame, a drive sleeve slippingly mounted on said drive shaft, an endless belt engaging said drive sleeve and at least one of said driven rollers to transmit torque from said drive shaft and said drive sleeve to said at least one driven roller, said belt folded over said drive shaft such that two strands of said belt pass over said drive shaft without said drive shaft passing through said endless belt, a bearing sleeve slippingly mounted on said drive sleeve with one strand of said belt at said fold passing over and engaging said bearing sleeve while the other strand at said fold is in driven engagement with said drive sleeve, and at least one rotatable idler over which said belt passes, the loop ends of said belt being supported by passing over one said rotatable idler and one of said driven conveyor rollers, the coefficient of friction between said drive shaft and said drive sleeve being greater than the coefficient of friction between said drive sleeve and said bearing sleeve.

5. A live roller conveyor comprising, a conveyor frame including two elongated side rails secured in spaced relation to each other, a series of driven conveyor rollers transversely supported for rotation between said side rails, a drive shaft underlying said rollers and journaled to said frame, an endless belt engaging said drive shaft and at least one of said driven rollers to transmit torque from said drive shaft to said at least one driven roller, said belt folded over said drive shaft such that two strands of said belt pass over said drive shaft without said drive shaft passing through said endless belt, a bearing sleeve slippingly mounted on said drive shaft with one strand of said belt at said fold passing over and engaging said bearing sleeve while the other strand at said fold is in driven engagement with said shaft, at least one rotatable idler over which said belt passes, and, at least two spaced snub rollers underlying said driven rollers, the loop ends of said belt being supported by passing over two rotatable idlers and at least two of said spaced snub rollers, and said snub rollers being positioned to snub said last-mentioned strand up into driving engagement with the underside of a plurality of said driven rollers positioned between said spaced snub rollers.

* * * * *